Sept. 12, 1950  F. R. SIAS  2,522,240
ANTIHUNT FEEDBACK GENERATOR FOR RECORDERS
Filed July 23, 1947
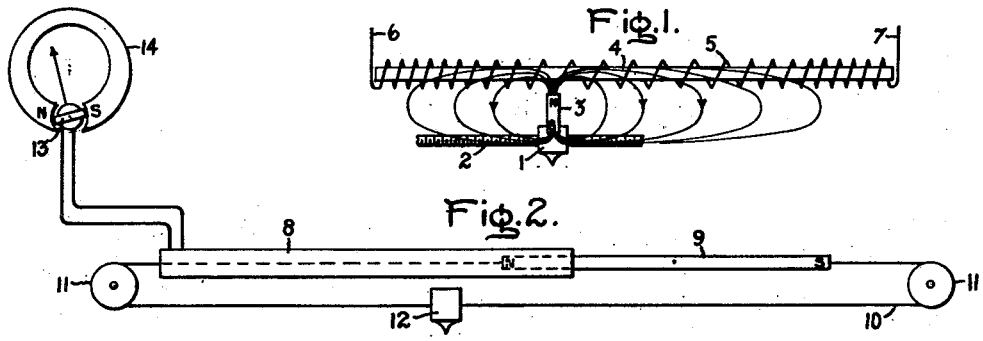
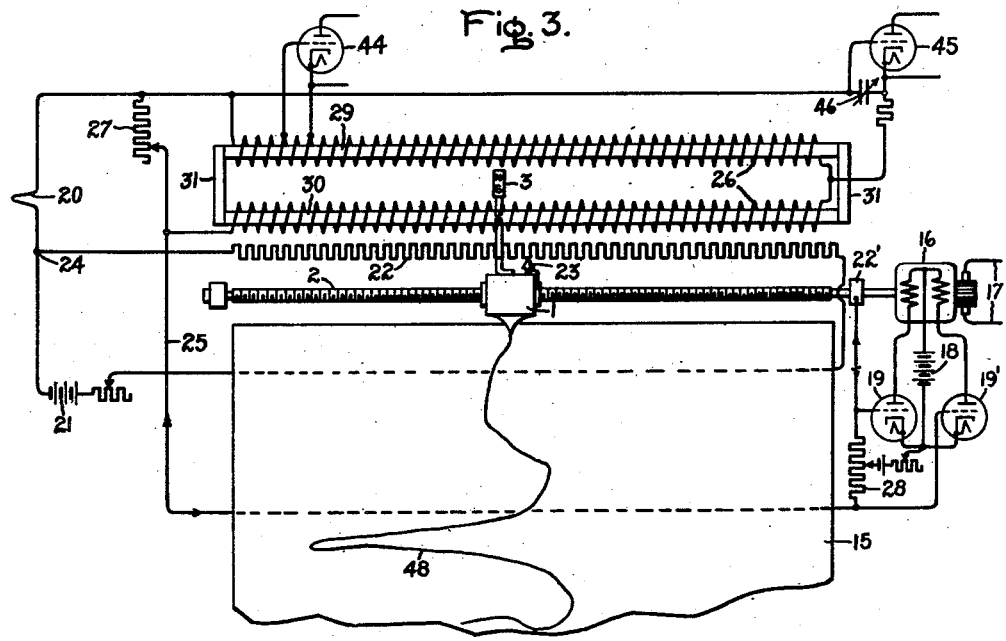
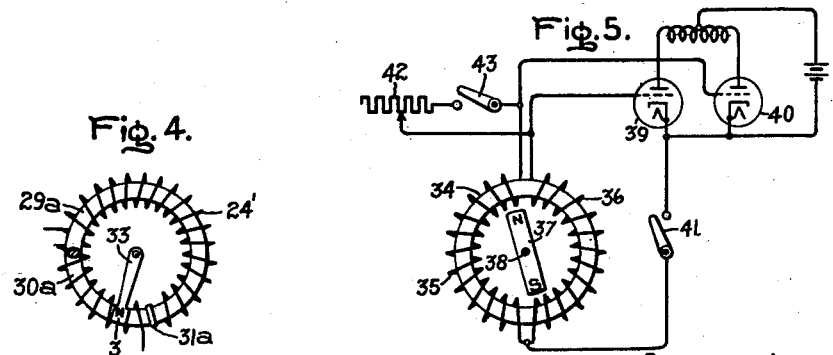
Inventor:
Frederick R. Sias,
by Browell P. Mack
His Attorney.

Patented Sept. 12, 1950

2,522,240

UNITED STATES PATENT OFFICE 2,522,240

ANTIHUNT FEEDBACK GENERATOR FOR RECORDERS

Frederick R. Sias, Marblehead, Mass., assignor to General Electric Company, a corporation of New York Application July 23, 1947, Serial No. 762,845

1 Claim. (Cl. 346—33)

My invention relates to a generator for producing a current in response to motion and is particularly suitable for feedback purposes in response controlled apparatus to prevent overshoot or hunting. My generator employs a stationary winding and a movable permanent magnet and employs no brushes or moving contacts. It will be explained in connection with a response recorder but its use is not limited in this respect.

The features of my invention which are believed to be novel and patentable will be pointed out in the claims appended hereto. For a better understanding of my invention reference is made in the following description to the accompanying drawing in which Fig. 1 represents a simple embodiment of my invention, which will be used to explain the basic principle of its operation. Fig. 2 represents another form of my invention and represents its use as a position transmitter in a telemetering system. Fig. 3 represents a preferred embodiment of my invention for providing damping control for a recording instrument, Fig. 4 represents a generator which in principle is the same as the generator of Fig. 3 but built in circular form for rotary movement, and Fig. 5 shows a rotary form of the invention having a modified principle of operation.

Referring now to Fig. 1, I may represent the stylus member of a recording instrument which has a linear motion in a horizontal direction due to rotation of the threaded shaft 2 on which I is mounted as a non-rotatable nut. Attached to and moved with the stylus nut I is a magnet 3 for producing a unidirectional flux and is preferably a permanent magnet so as to avoid the necessity of supply connections thereto. Extending along and adjacent to the path of movement of the nut I and its permanent magnet 3 is a magnetic rod 4 on which is wound an elongated winding coil 5, with terminals 6 and 7 at its ends. The turns of the winding 5 may be uniformly distributed or otherwise over the length of the rod 4, and there may be one or more layers in the winding. All turns are assumed to be wound in the same direction. A single layer is represented with the turns more closely together near the ends than over the center portion. The curved line emanating from the magnet 3 represents the general flux distribution to be expected. Thus the north pole flux of the magnet which is adjacent the winding covered rod enters the rod and flows therein in opposite directions for varying distances and returns through the air to the south pole of the magnet. If the shaft 2 is of magnetic materials, it will reduce the reluctance of the flux path and improve the efficiency of the generator.

In the stationary condition of the parts no voltage will be generated in the winding. If the stylus nut with the magnet 3 be moved to the right, a voltage will be generated in the coil which will be proportional to the rate of movement. The coil turns to the right will be cut by a decreasing flux in one direction and those at the left will be cut by an increasing flux in the opposite direction, so that the voltage generated in all turns cut by the flux will be in the same direction in the coil. This is also accompanied by changes in the number of coil turns linked by the two fluxes in the proper direction to assist in the generation. This voltage will appear across the terminals 6 and 7, and such terminals may be connected in a damping control circuit for the recorder to cause a current to flow in such circuit. In case the direction of motion of the stylus magnet is reversed, the voltage and current generated will reverse. Thus I have provided a direct current generator without commutator and brushes or other moving contact devices which produces a current proportional to the rate of motion of a small permanent magnet, which current reverses with the direction of motion. The ratio of current generated to rate of motion may be made linear, or it may be made to vary at different magnet positions as, for example, by varying the air gap between magnet 3 and rod I, or by varying the turn distribution of the coil 5 along the rod, or by varying the cross section or permeability of the rod. With the turns more closely spaced near the ends than over the central portion, as represented, the generator action will be more vigorous over the end portions.

In Fig. 2 there is represented an embodiment having a stationary winding 8 in the form of a hollow cylinder with an elongated permanent magnet 9 arranged to be moved axially in the coil by means of a cable 10 operating over pulleys 11 and carrying a recording stylus 12. To obtain a linear voltage response, one end of the magnet should remain within the coil and for this purpose, the position of the magnet shown may be considered to be at nearly the extremity of its travel to the right. In Fig. 2 the coil 8 is represented as being connected in circuit with the moving coil 13 of a fluxmeter having a permanent magnet field 14. Such a meter has no zero return torque, and the armature coil will stay where last positioned by its current when it ceases flowing. A meter of this character is described in United States Patent No. 2,356,608, August 22, 1944. Such a meter is in effect a permanent magnet field direct current motor having a range of operation less than ½ revolution, and hence, requiring no brushes and commutator. If the meter is properly designed in relation to the generator source of supply, the system represented may be used to indicate the movement and position of stylus 12 at a remote point. For this purpose the generator consisting of coil 8 and magnet 9 should generate just sufficient current over its range of operation to operate the fluxmeter over its range of operation, and the moving elements should be positioned initially at the midpoints of such ranges.

In Fig. 3, I have represented my invention used as a damping control on a recorder. The stylus nut 1 is threaded on a shaft 2 as in Fig. 1. The stylus marks on a recording sheet 15. The shaft 2 is turned by a reversible electric motor 16 represented as being of the direct current type and the armature of which is supplied from a direct current source 17. The reversing field windings of the motor are supplied from a direct current source 18 through selective electronic amplifier switching means represented by tubes 19 and 19'. The recorder is represented as used for recording the temperature to which a thermocouple at 20 is subjected. The voltage of the thermocouple is opposed by and compared to a standard voltage in a potentiometer circuit containing a battery 21 and a resistance 22 on which there is a moving contact 23 secured to and moved with the stylus nut 1. There is a common connection 24 from one side of the thermocouple 20 to the left end of resistance 22 and the battery 21.

Thus the battery 21 produces a predetermined voltage drop across resistance 22, and the voltage of thermocouple 20 is compared to that portion of the voltage across resistance 22 between slider 23 thereon and the left-hand end of the resistance 22. The slider 23 is connected to the grid of tube 19 through a circuit represented as the metal threaded portion of nut 1, shaft 2, and bearing 22'; and the other side of the thermocouple 20 is connected to the control grid of tube 19 through the wire 25. However, the winding 26 of my antihunt or damping generator is included in the last-mentioned connection and the influence of such generator may be reduced as desired by means of an adjustable resistance 27 in shunt thereto. A suitable impedance 28 may be connected between the control grids of tubes 19 and 19', and provisions may be made as indicated for the proper negative bias on such grids in the idle or noncontrolling condition. It is to be understood that the electronic amplifier switching apparatus is only representative and that there are available a variety of different arrangements that might be used, and the arrangement to be used will be one suited to the conditions encountered.

It will now be apparent that when the slider 23 is stationary, no voltage will be generated in winding 26 and that the voltage, if any, impressed upon the grids of tubes 19 or 19' will depend upon the difference in voltage, if any, between thermocouple 20 and that across the left-hand portion of resistance 22 between the slider 23 and point 24, and that the polarity of such voltage will depend upon which voltage is the greater. It will be assumed that when the thermocouple voltage predominates, tube 19' passes current or more current than tube 19 to energize that motor field winding which causes the motor to run in a direction to move slider 23 to the right, thereby increasing the voltage of the slide wire between slider 23 and point 24 until it equals the thermocouple voltage at which time the motor 16 stops. On the other hand, if the thermocouple voltage is low due to a low temperature, tube 19 will pass current or more current than tube 19' to move slider 23 to the left until the control voltages are equalized. The voltage, produced in winding 26 of the antihunt generator only when the magnet 3 moved with slider 23 is in motion, will be superimposed on the control voltage and will be in such a direction and of such magnitude as to obtain the results desired. For antihunt purposes it will oppose the control voltage. The direction of the antihunt generator voltage may be reversed relative to the control voltage by reversing its terminal connections and may be introduced into the control circuit at any convenient point.

The generator of Fig. 3 is of a more efficient design than those previously explained and comprises two parallelly disposed magnetic rods 29 and 30 between which the permanent magnet 3 moved with stylus nut 1 is disposed. The ends of the rods 29 and 30 are supported and joined by bars 31 which may be magnetic or nonmagnetic, depending on the generator characteristics desired. The sections of the elongated winding 24 wound on the two rods are wound in the same direction but produce current in the opposite direction in their coil sections, because one section is cut by a south pole flux and the other section by a north pole flux. However, the two coil sections are connected in series to cause the voltages or currents to add. Movement of the permanent magnet 3 in one linear direction will produce current in one direction in the generator circuit, which direction will reverse with reversal of the direction of movement. The generator action is zero at standstill and is proportional to the rate of movement when the magnet 3 is moved by operation of motor 16. Here again the response of the generator may be linear or it may be made variable for different positions of the magnet as, for example, by varying the coil turn distribution or varying the spacing between rods 29 and 30 by bending to vary the air gap between them and the magnet. In Fig. 3 the end bars 31 are assumed to be of magnetic material, as this contributes to linear generator response over the entire range of movement. If the bars 31 were made of brass, there would be a voltage rise at each end of the travel amounting to about 50 per cent of the voltage generated at the center of the range. It will be evident that this form of generator is not influenced by stray fields, such as produced by direct current machines near the device, since the stray flux in one rod will cancel the influence of the stray flux in the other rod.

Voltage is generated with movement of the magnet 3 because of the shift of leakage flux between the bars. Thus, if the magnet 3 is at the right end of the bars, flux will flow to the left in the upper bar 29 and to the right in the lower bar 30. If the magnet is at the left end of the bars, flux will flow to the right in the upper bar and to the left in the lower bar. This reversal of flux occurs progressively as the magnet is moved from one end to the other and causes a change in flux linkage, cutting the coil turns, and since this change is approximately proportional to the rate of movement of the magnet, a corresponding voltage is generated by such movement. Probably due to hysteresis, with the first device like that shown in Fig. 3, which was built and tested, the voltage generated at the beginning of magnet movement is slightly higher than after a short amount of movement. Now with this antihunt generator connected in series with the bridge balance detector relay circuit, the generator voltage may be made to add or oppose the bridge voltage when the stylus nut is being moved. Generally with a sensitive relay it will be desirable to connect the generator to oppose the bridge balancing voltage, as this will produce a damping result and prevent hunting, and this is the connection assumed in Fig. 3.

The operation may be described as follows. With the control voltages balanced motor 16 is stationary, and no voltage is generated in winding 26. Now assume that the temperature of thermocouple 20 increases and produces an unbalance, tending to cause a current flow in the control circuit in the direction represented by full line arrows on such circuit causing the electronic relay to function to cause the motor 16 to start and move contact 23 to the right in the direction to balance the bridge. As soon as magnet 3 starts to move to the right, a voltage is generated in winding 26 which is in such a direction as to tend to cause a bucking current to flow in the control circuit as represented by the dotted line arrows thereon. This bucking voltage is proportional to the rate of movement of the stylus nut 1 and tends to cause the electronic relay to return to a neutral condition and stop the motor 16 before there is overtravel.

When the temperature and voltage of thermocouple 20 drops, the unbalanced control voltage is in the opposite direction and causes the electronic relay to function in the reverse sense, thereby causing the motor 16 to run and drive the stylus nut 1 and magnet 3 to the left. The anti-hunt generator now produces an opposing voltage in the relay circuit and again causes the relay to drop out before there is overtravel. The desired magnitude of this anti-hunt voltage which is thus introduced into the control circuit when there is recorder movement may be controlled by an adjustable resistance at 27 across winding 26. In general the anti-hunt generator will be designed to produce the maximum action that can be reasonably required and then its influence on the relay circuit reduced as needed by resistance 27.

It will now be evident that we may, to advantage, use a motor at 16 which is designed to increase in speed when energized somewhat gradually but to reach rather quickly a speed where it will drive the stylus nut rapidly so that there will be a quick response of the recorder apparatus for sudden and large changes of the quantity being measured and recorded, as well as a more gradual response to small changes. This is possible by reason of the fact that the voltage of the anti-hunt generator is proportional to the rate of movement of the stylus unit, and the anti-hunt feature is effective for small slow movements of the stylus nut as well as for large rapid movements.

It is of course apparent that considerable refinement may be made in the control of the motor or other drive which balances the bridge, and that applicant's anti-hunt generator is applicable to a wide variety of response type of controls for different purposes well-known in the art.

If desired, the linear type of anti-hunt generator may be constructed for rotary movement. Thus in Fig. 4, I have shown portions of a generator corresponding to that shown in Fig. 3 where the two magnetic rods are bent into circular form and designated 29a and 30a, with the magnet 3 arranged on a shaft arm 33 so as to move between the rods in a circular path. The two-coil elongated winding 24' is the same as in Fig. 3 except curved instead of straight. In this case a single end plate 31a may be used between the rods at the extremities of the range of movement. The effective range of operation is of the order of 330 degrees.

Fig. 5 represents another embodiment of my anti-hunt generator invention, using a single continuous ring 34 of magnetic material with coil sections 35 and 36 wound in opposite directions over slightly less than each one-half of the ring. A bar permanent magnet 37 is used and extends diametrically across the ring and is mounted for rotation with a center shaft 38. The coil sections are connected in series so that the voltages generated therein by rotation of the magnet add. This form is limited to less than one-half revolution for continuous generator action and a given direction of current flow.

It is to be observed that in all modifications of the invention in generating a current in the anti-hunt generator circuit, a certain extra amount of energy is required to move the permanent magnet. This mechanical energy is converted into electrical energy by the genator and is, of course, proportional to the rate of motion. Hence it follows that the device serves directly to produce damping action on the motion of the permanent magnet and whatever it is driven by, and can be used solely as such form of antihunt damper. Thus in Fig. 3 the energy converted to heat in resistance 27 is reflected in the corresponding amount of damping of the movement of the stylus member and such damping may be varied by adjustment of the resistance. Thus there is a combined antihunt or damping controlling action on the operation of motor 16, consisting of an electrical control on the input to the motor and a damping load control on the mechanical output of the motor, both of which are adjustable and which may be used in combination in various ratios.

Thus in Fig. 5 the generator shown may be connected to control tubes 39 and 40 by closing switch 41, using a negligible amount of power from and direct mechanical damping of the generator, or the generator may be connected to a resistance 42 by closing switch 43 to obtain output load damping only, or both switches may be closed to effect both electric types of damping control, and the relation between tube control and load damping may be adjusted by the adjustable resistance 42. The reversely connected coils shown in the plate circuits of the amplifier tubes may be taken to represent any suitable means for introducing antihunt damping control into a reversible response controller system.

In Fig. 3 there is shown an electronic relay 44 having its control grid and cathode connected across a few turns of one section of the winding 24 at a position near the left-hand end of the range of movement of the magnet 3. When the magnet 3 passes this position in one direction, the voltage induced in the section of winding connected to the electronic relay may be used to actuate the relay to cause an alarm or operate some control device or the like. It is to be observed that the polarity of the voltage generator in the winding section connected to the relay depends upon the direction of movement of the magnet 3 past the same, and hence the relay will operate for one direction of movement of the magnet past the section but not the other. It is also to be observed that the flow of current through the winding section connected to the electronic relay due to movement of the magnet 3 at other positions along the generator will be insufficient to operate the relay regardless of its direction. Such a relay arrangement can also be made sensitive to the rate of travel of the magnet 3 past its coil section, if so desired, simply by adjusting the grid control to fire the tube only when it exceeds a predetermined value in one direction. Thus the arrangement adapts itself for use as a contactless, direction responsive, or direction and rate responsive relay.

At 45 is an electronic alarm or control relay with its control connected across the entire length of one coil section of the generator and with an adjustable condenser 46 across the control circuit. The storage condenser and tube can be adjusted to respond only to a prolonged high rate of travel of the recorder stylus in one direction over any part of its range indicative of some unusual condition such, for example, as total failure of heat supply to the thermocouple 20 as is indicated by dip 48 in the record shown.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

In combination with a response device recorder having a recording stylus carriage with a reverse back and forth lateral movement over the recording range, a reversible power means for operating said recording stylus carriage, control means for said power means for determining the direction and extent of travel of said recording stylus carriage, measuring means to which said control means is responsive to enable the recorder to record a measurement and a damping control for said recorder comprising a direct current generator consisting of a movable permanent magnet immovably fixed to said recording stylus carriage and contained within the lateral limits thereof so as to have a back and forth movement with said carriage within the lateral limits of travel thereof, a stationary elongated winding positioned adjacent to and along the path of movement of said magnet such that the coils of said winding will be cut by the flux of the magnet when it is moved to generate a voltage in said winding proportional to the rate of movement of the magnet, said voltage reversing with reversals in the direction of movement of the recording stylus carriage and magnet, and connections from said direct current generator winding to said control means for introducing into said control a response from such damping generator which is in opposition to the measurement response.

FREDERICK R. SIAS.

REFERENCES CITED

The following references are of record in the file of this patent:

UNITED STATES PATENTS

| Number | Name | Date |
|---|---|---|
| 2,050,446 | Meyer | Aug. 11, 1936 |
| 2,105,598 | Hubbard | Jan. 18, 1938 |
| 2,113,436 | Williams, Jr. | Apr. 5, 1938 |
| 2,207,343 | Fairchild | July 9, 1940 |
| 2,286,897 | Costa et al. | June 16, 1942 |
| 2,482,065 | Hornfeck | Sept. 13, 1949 |

OTHER REFERENCES

Elementary Lessons in Electricity and Magnetism: S. P. Thompson; MacMillan and Company, New York, 1895, pages 210–211.